UNITED STATES PATENT OFFICE.

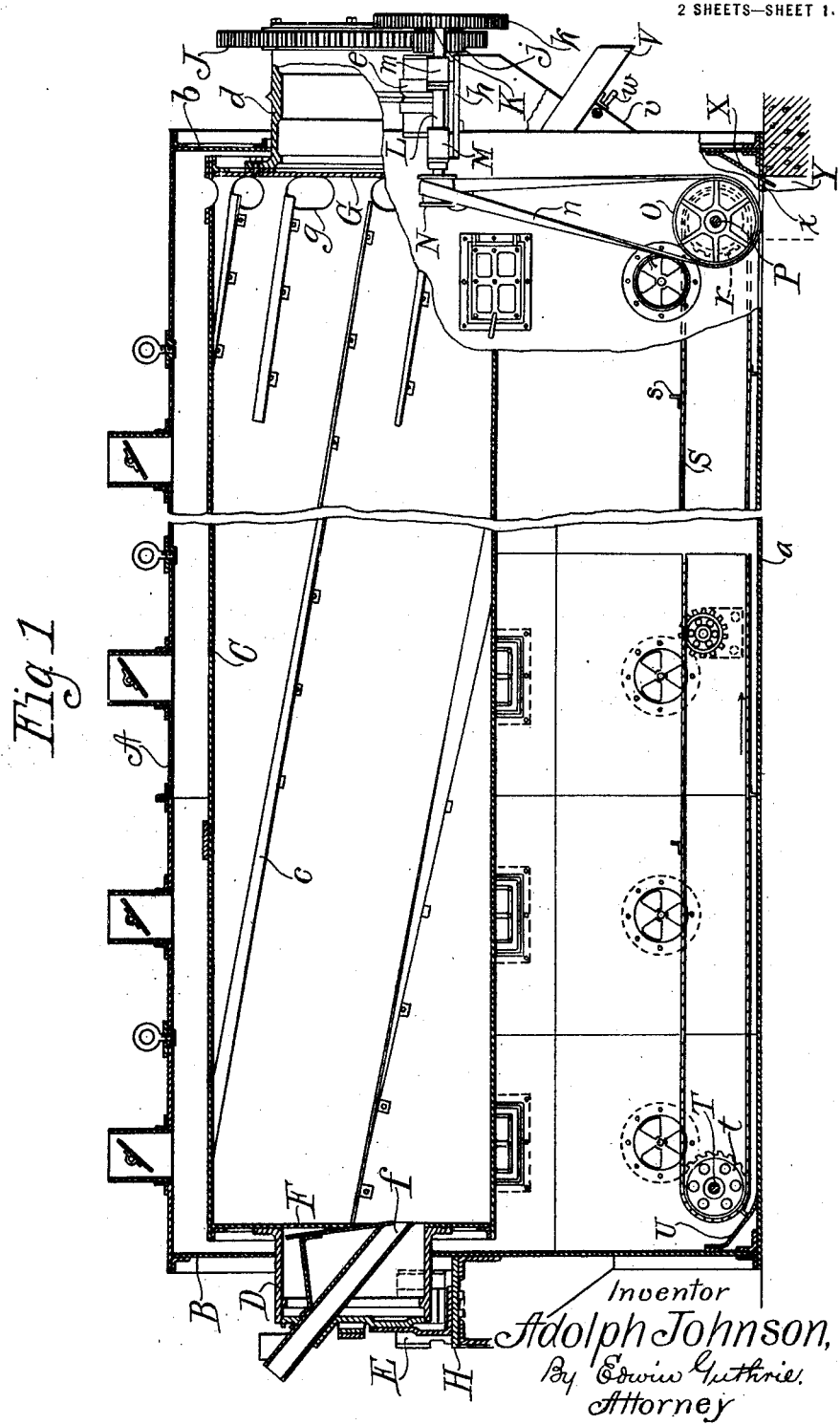

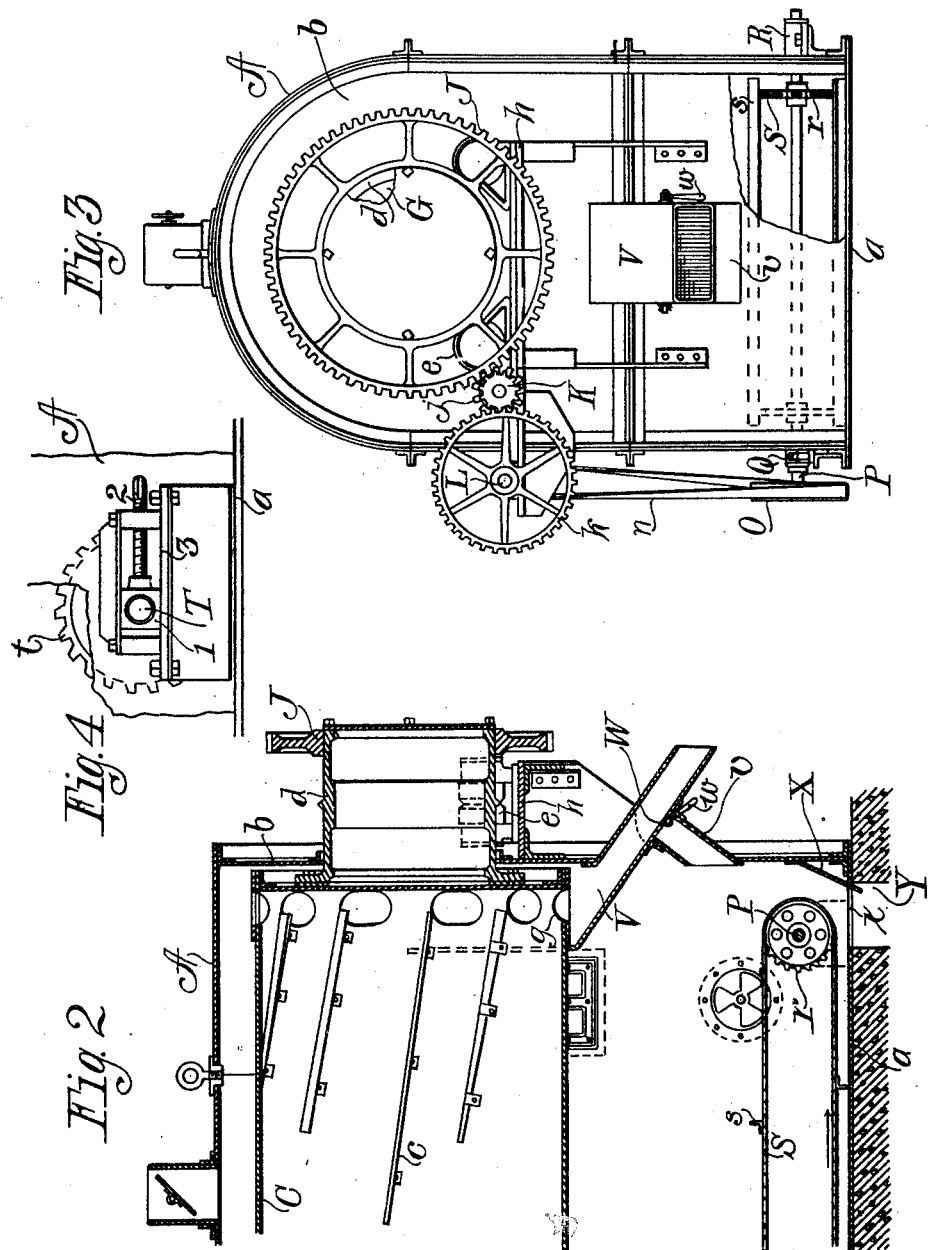

ADOLPH JOHNSON, OF BATTLE CREEK, MICHIGAN.

CONVEYER-SCRAPER FOR CEREAL-OVENS.

1,367,549.  Specification of Letters Patent.  Patented Feb. 8, 1921.

Application filed November 8, 1919. Serial No. 336,651.

*To all whom it may concern:*

Be it known that I, ADOLPH JOHNSON, a citizen of the United States, residing at Battle Creek, in the county of Calhoun and State of Michigan, have invented certain new and useful Improvements in Conveyer-Scrapers for Cereal-Ovens, of which the following is a specification.

This invention relates to conveyer scrapers for cereal ovens or driers, the object being to improve the construction of certain parts of the invention upon which Letters Patent of the United States were granted to me April 1, 1919, No. 1,298,955, and to provide the same in the lower part of the casing with a chain conveyer scraper suitably operated and arranged to scrape or sweep dust and particles deposited upon the bottom of the casing, to and into an opening in the bottom leading to a receiving spout or bin. Another object of this invention is to construct in connection with the outlet or discharge spout for the material from the oven or drum a conduit furnished with a controlling gate, in order that should a portion of the material treated at any time come through in an imperfect or undesirable condition, the gate or damper may be adjusted to close the regular discharge spout and to direct the damaged product into the conduit and by way of the same into the opening in the bottom of the casing and into the receiving bin or receptacle.

The construction and arrangement of the parts comprising this invention are set out in the accompanying drawings, of which Figure 1 represents a longitudinal, vertical section of an oven or drier built in accordance with this invention and provided with a conveyer scraper. All the parts assembled are illustrated in this figure. Fig. 2 is a vertical section of the end of the casing and related parts. This section is also taken lengthwise of the casing. Fig. 3 is an external end view of the right hand end, as the parts are shown in Fig. 1. Fig. 4 is a fragmentary view of a portion of the side of the casing, showing a side view of the adjustable bearing for tightening the conveyer chains.

Throughout the drawings and description the same character is employed to refer to the same part.

Considering the drawings, the external casing A has the bottom $a$, and the ends B and $b$. Inside the casing is the revoluble drum C, and interiorly the drum is provided with the wings $c$. In practice the wings from the left end toward the center have a greater degree of inclination than those from the center or middle toward the right. The object of this arrangement is to move products faster at the starting end, that is to say, the left hand end in Fig. 1, where the greatest degree of heat is used. When the product reaches the other wings of lesser degrees of inclination it moves slower with reduced heat. This is for the purpose of removing all the moisture in the product, which can only be done by the slower progress in traveling through the drum C. By this arrangement of the wings it will be observed that the product travels at two different speeds with one speed of the revolving drum. The drum is provided at its ends with the hollow trunnions D and $d$, and the trunnions are supported by suitable rollers E and $e$. The left hand end of the drum C has the inlet spout $f$ for the introduction of material. The end of the drum is marked F. The other end of the drum C designated by the reference letter G has adjacent to it in the wall of the drum the outlet ports or orifices $g$. It is by these outlets that the baked matter leaves the drum.

Plates H and $h$ upon the outside of the ends of the casing A are suitably supported by brackets attached to the casing, and the plates carry the rollers which bear the hollow trunnions upon the ends of the drum C.

On the end of the trunnion $d$ is the large gear J, which meshes with the pinion $j$, which is a double pinion and is in one with the second pinion K. The second pinion K drives the gear $k$ on horizontal shaft L in bearings M and $m$, and the inner or left hand end of the shaft L carries the small pulley N. A belt $n$ connects the small pulley N with the larger pulley O on shaft P, which passes through the lower right hand corner of the casing A, and is best shown in Fig. 3. The shaft P is carried in bearings Q and R, and it will be here noted that the bearings are placed upon the outside of the casing A, although this invention is not limited to that arrangement of the bearings. The shaft P carries near its ends within the casing sprocket wheels such as the wheel $r$ and upon the sprocket wheels are sprocket chains such as the chain S, and the chains are connected by transverse angle iron scrapers $s$. At the left hand end of the casing there are two other sprockets such as the sprocket $t$ on the shaft T. The sprockets are all alike, and the shafts P and T are alike also. In practice it is usual to provide the guard or cover plate U for the corner of the casing, in order that the corner may not be packed with accumulated dust and dirt. It will be noted that the angle irons $s$ sweep the guard plate U, as shown in Fig. 1.

Considering now Fig. 2, which illustrates the right hand end of the casing in section lengthwise of the casing, there will be noted the hopper having the spout V extending from inside to outside of the casing A. This is the hopper that receives the baked or dried material from the orifices $g$ of the drum G, and the spout extends to the outside for the delivery of the baked product as desired. Opening into the spout V is the conduit $v$, and the opening into the spout is controlled by the gate or damper W, operated by a handle $w$. It will be observed that the spout V inclines downwardly and outwardly, while the conduit $v$ inclines downwardly and inwardly, and extends through the end of the casing. Immediately below the mouth of the conduit within the casing is a corner guard plate X which directs falling material through the opening $x$ in the bottom $a$ of the casing A, and into the pit or bin Y that is intended to receive material from the conduit, and also dust and particles moved to the opening $x$ by the scraper.

In Fig. 4 it is shown that the shaft T is carried in a movable bearing block 1, operated by a screw 2 upon a slide 3. This device is used to take up slack in the conveyer chains, and the chains may be suitably supported by intermediate sprockets as illustrated in Fig. 1.

The operation of this invention is believed to have been made clear by the foregoing explanation. The belt $n$, deriving its power from the revolution of drum C through the gearing described, moves the chains and scrapers in the direction of the arrow in Fig. 2, and the dust is swept to and into the opening $x$ in the bottom of casing A, and into the pit Y. The dust is continually falling during the operation of the oven.

Let it be assumed that some portion of the material is not baked or dried as desired, and is to be discarded. The gate W is swung up to close spout V, and the damaged material falls through conduit $v$ into the pit Y with the dust conveyed thereto by the scraper.

I claim:—

1. In a conveyer scraper for cereal ovens, the combination with an outer casing, of a revoluble drum within the casing, said drum being provided with inlet devices for material at one end and outlet devices at the other end, the bottom of the said casing having an opening arranged below the said outlet devices of the drum, a continuous chain scraper extending throughout the length of the said casing at the bottom thereof and having scraping members arranged to move deposits upon the said bottom to and into the said opening, and means for operating the scraper.

2. In a conveyer scraper for cereal ovens, the combination with an outer casing, of a revoluble drum within the casing, said drum being provided with inlet devices for material at one end and outlet devices at the other end, the bottom of the said casing having an opening arranged below the said outlet devices of the drum, a continuous chain scraper extending throughout the length of the said casing at the bottom thereof and having scraping members arranged to move deposits upon the said bottom to and into the said opening, means for rotating the drum, and means actuated by the said drum-rotating means for operating the scraper.

3. In a conveyer scraper for cereal ovens, the combination with an outer casing, of a drum within the casing, said drum being provided with inlet devices for material at one end and outlet devices at the other end, the bottom of the casing having an opening arranged below the said outlet devices of the drum, a hopper arranged below the said outlet devices and higher than the said opening, a spout from the hopper extending through the casing, a conduit opening into the said spout and arranged to discharge rejected material into the said opening, and means for controlling the said opening of the conduit into the spout.

In testimony whereof I affix my signature.

ADOLPH JOHNSON.